United States Patent
Wang et al.

(10) Patent No.: US 11,399,002 B2
(45) Date of Patent: Jul. 26, 2022

(54) SOCIAL NETWORK COLLECTIONS

(71) Applicant: Meta Platforms, Inc., Menlo Park, CA (US)

(72) Inventors: Xiao Ou Wang, San Francisco, CA (US); Josselyn Tsai, Brooklyn, NY (US); Ryan Keenan Olson, San Francisco, CA (US); Shilpa Sarkar, San Fancisco, CA (US); Derek Jalee Tsay, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/003,787

(22) Filed: Aug. 26, 2020

(65) Prior Publication Data
US 2021/0359969 A1 Nov. 18, 2021

Related U.S. Application Data

(60) Provisional application No. 63/025,520, filed on May 15, 2020.

(51) Int. Cl.
*H04L 12/00* (2006.01)
*H04L 51/52* (2022.01)
*G06F 3/04842* (2022.01)

(52) U.S. Cl.
CPC .......... *H04L 51/32* (2013.01); *G06F 3/04842* (2013.01)

(58) Field of Classification Search
CPC ..... H04L 51/32; H04L 51/14; G06F 3/04842; G06Q 50/02; G06Q 10/06
USPC .................. 709/206, 204; 707/737; 715/725
See application file for complete search history.

(56) References Cited

U.S. PATENT DOCUMENTS

| | | | |
|---|---|---|---|
| 9,110,953 B2* | 8/2015 | Steinberg | H04L 67/36 |
| 9,224,095 B2* | 12/2015 | Booth | G06N 5/02 |
| 9,514,331 B2* | 12/2016 | Kanter | H04L 67/10 |
| 9,684,868 B2* | 6/2017 | Lawrence | G06Q 50/01 |
| 2006/0143068 A1* | 6/2006 | Calabria | G06Q 30/0623 705/26.61 |
| 2011/0022602 A1* | 1/2011 | Luo | G06F 16/24578 707/723 |
| 2012/0084655 A1* | 4/2012 | Gallagher | H04L 65/403 715/725 |
| 2012/0110096 A1* | 5/2012 | Smarr | H04L 67/1044 709/204 |
| 2013/0297694 A1* | 11/2013 | Ghosh | G06F 16/34 709/204 |
| 2013/0304818 A1* | 11/2013 | Brumleve | G06Q 30/02 709/204 |
| 2014/0195605 A1* | 7/2014 | Kallayil | H04L 67/22 709/204 |

(Continued)

*Primary Examiner* — Frantz Coby
(74) *Attorney, Agent, or Firm* — Lee & Hayes, P.C.

(57) ABSTRACT

Techniques are described that enable a user to create a collection of content posts on a social networking system. In some cases, a social networking system receives multiple content posts to be shared, and shares the multiple content posts with a first group of user accounts. The social networking system receives a request to create a collection of one or more content posts of the multiple content posts, where the request includes a descriptor associated with the collection. The social networking system generates the collection of the one or more content posts including the descriptor, and provides the collection to a second group of user accounts.

20 Claims, 11 Drawing Sheets

(56) References Cited

U.S. PATENT DOCUMENTS

| | | | |
|---|---|---|---|
| 2014/0229479 A1* | 8/2014 | Sharafi | G06Q 50/01 707/736 |
| 2015/0013016 A1* | 1/2015 | Kanter | H04L 63/20 726/28 |
| 2015/0134659 A1* | 5/2015 | Meyer | G06Q 30/02 707/737 |
| 2018/0137199 A1* | 5/2018 | Miller | G06Q 50/01 |

* cited by examiner

SOCIAL NETWORK COLLECTIONS

CROSS REFERENCE TO RELATED APPLICATIONS

This application claims priority to U.S. Patent Application No. 63/025,520, filed May 15, 2020, titled "SOCIAL NETWORK COLLECTIONS," the entire contents of which are incorporated herein by reference.

BACKGROUND

Social networking systems allow users to connect with each other by sharing events, sharing content such as photos and videos, and sharing interests. Users are continually searching for ways to express themselves, and connect with communities of other users having similar interests. Therefore, social networking systems continue to provide users with increasing options for content sharing that allow users to connect with one another.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
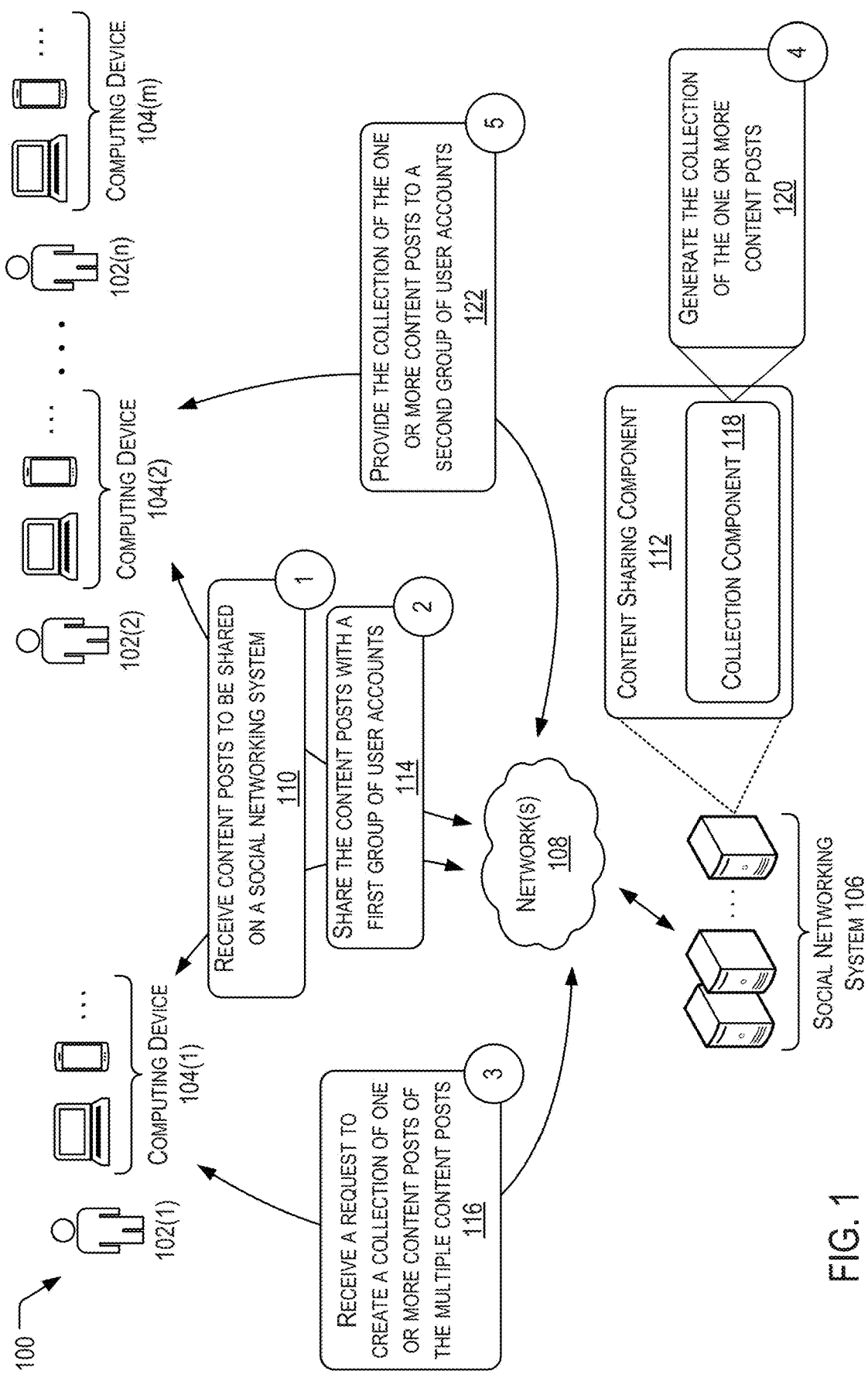
FIG. 1 is a schematic view of an example system usable to implement example techniques for social network collections described herein.

As discussed above, social networking systems continue to develop fun and unique ways for users to connect with each other, such as based on shared interests of different users. In some cases, a user may want to share their point of view or expertise about a particular topic or interest that the user has. However, conventional systems prove difficult for a user to curate content items related to a particular topic, while allowing the user to share their point of view or expertise on the topic with other users who may be interested.

This application describes techniques for providing social network collections or "guides" via a social networking system and/or service (herein referred to as a "social networking system"). As described in more detail below, a collection is a curation of one or more persistent and publicly accessible content posts by a user account and a descriptor of the curation provided by the user account.

Various embodiments of the present disclosure include systems, methods, and non-transitory computer-readable media of a social networking system.

For instance, in one example, a social networking system may operate a service that corresponds to a dedicated application installed on a user device. The social networking system may enable users to share content via the application installed on the user device. Alternatively or additionally, the social networking system may enable users to share content, and/or access (e.g., view) content shared by other user accounts, via a web-based application accessed via a web browser. In some cases, the shared content may be accessed (e.g., viewed) by devices associated with other users that also have the application installed on their respective devices. The social networking system may store account information associated with each user and the respective device on which the application is installed.

In some examples, the social networking system may receive, from one or more user accounts associated with a social networking system, multiple content posts to be shared on the social networking system. In some examples, the multiple content posts are persistent (e.g., non-ephemeral) and publicly accessible (e.g., able to be viewed by other user accounts on the social networking system regardless of whether the other user accounts are a "follower" of the user account that shared the content post). The social networking system shares the multiple content posts with a first group of user accounts associated with the social networking system, such as by providing the multiple content posts in feeds of followers of the user account(s) that shared the multiple content posts. In some examples, the social networking system then receives, from a user account, a request to create a collection of one or more content posts of the multiple content posts, where the request comprises a descriptor associated with the collection. The social networking system generates the collection of the one or more content posts including the descriptor. Then, the social networking system provides the collection of the one or more content posts and the descriptor to a second group of user accounts associated with the social networking system. For instance, the second group of user accounts may be followers of the user account, and/or user accounts that view a profile of the user account that created the collection.

In some examples, the user account is a first user account, and at least one of the multiple content posts is received from a second user account that is different from the first user account. In this way, the user account may include content posts shared by other user accounts in the collection.

In some examples, at least one of the multiple content posts is received from the user account. Therefore, the user account can include content posts that the user account itself shared on the social networking system in the collection, alternatively or in addition to content posts shared by other user accounts.

In some examples, the descriptor comprises one or more of a title for the collection or a statement describing contents of the collection. In some examples, the descriptor associated with the collection may additionally or alternatively describe a topic to which the multiple content posts relate (e.g., travel, beauty, restaurants, recipes, cars, etc.), a reason that the user compiled the collection (e.g., to share their point of view, interests, expertise, etc.), information about the user that compiled the collection, or other information related to the collection as a whole.

In some examples, the descriptor is a first descriptor associated with the collection, and the social networking system receives one or more second descriptors associated with one or more of the content posts included in the collection.

In some examples, the second descriptor(s) that are associated with individual ones of the content posts included in the collection may include, among other things, a title for the one of the respective content post, a review or critique of the respective content post and/or the subject(s) depicted in the respective content post, an opinion about the respective content post and/or the subject(s) depicted in the respective content post, or other description or information about the respective content post and/or the subject(s) depicted in the respective content post. In this way, the user account can provide its point of view on individual content posts included in the collection, can describe how the content post fits in with the collection, and so forth.

In some examples, the user account is a first user account and the social networking system further receives, from the first user account or a second user account, a selection of a control to share a link to the collection as an ephemeral content item. The social networking system shares the link to the collection with the second group of user accounts (e.g., if the first user account shares the ephemeral content item) or a third group of user accounts (e.g., if the second user account shares the ephemeral content item) as part of the ephemeral content item. In examples, sharing the link to the collection as an ephemeral content item provides a way to advertise the presence of the collection to a wider audience.

In some examples, the user account is a first user account, and the social networking system provides a control that, when selected by a second user account, causes the second user account to provide feedback on the collection. For instance, feedback may include "liking" the collection, providing a comment on the collection, expressing an emotion (e.g., using emojis) about the collection, and the like.

In some examples, the social networking system associates the collection with a location based at least in part on a tagged location of at least one of the one or more content posts included in the collection.

In some examples, the user account is a first user account, and the social networking system provides a thumbnail associated with the collection on a profile page of the first user account. Responsive to receiving a selection of the thumbnail from a second user account, the social networking system provides the collection to be viewed by the second user account. In this way, users can access the collections shared by a particular user account from the profile page of the user account.

In some examples, the user account is a first user account, and a content post of the multiple content posts is received from a second user account. The social networking system may notify the second user account that the content post is being included in the collection by the first user account. For example, the social networking system may send a notification to a social networking application associated with the second user account that a content post they previously shared is being used in a collection curated by the first user account.

In some examples, the user account is a first user account and a content post of the multiple content posts is received from a second user account. The social networking system may receive, from the second user account, a selection of a control to remove the content post from the collection by the first user account, and remove, responsive to receiving the selection, the content post from the collection. In this way, owners or creators of content retain control over whether or not their content posts can be used in collections created by other user accounts.

In some examples, the request to create the collection comprises an indication of a collection type for the collection, where the collection type corresponds to at least one of a content post collection type, a product post collection type, or a place post collection type.

In some examples, the indication of the collection type comprises the product post collection type. The one or more content posts may comprise a product post indicating one or more products that are available for purchase via the social networking system. Accordingly, a user may curate a collection of products shared by other user accounts (e.g., merchant accounts) and may include the user's review and/or point of view of the products in the descriptor(s) of the collection.

In some examples, the product post may comprise one or more characteristics of the one or more products indicated in the product post. For instance, the one or more characteristics may include a product description, a price, a merchant description associated with a merchant of the one or more products, and/or a link to a website for the merchant. The characteristics may provide users viewing the collection with information about the products included in the collection directly from the merchant (e.g., as included in the previously shared post), such that the user that created the collection is not required to repopulate the post included in the collection with this information.

In some examples, the indication of the collection type comprises the place post collection type. The social networking system may receive a location from the user account to associate with a first item in the collection (e.g., a city, state, place of business, park, neighborhood, street address, etc.). The social networking system may determine that a first content post of the one or more content posts was associated with the location when shared on the social networking system. In examples, the social networking system determines that a second content post of the one or more content posts was associated with a different location than the location when shared on the social networking system. The social networking system may include the second content post in a second item in the collection based at least in part on the second content post being associated with the different location. Therefore, the collection may be organized such that each item in the collection is associated with a different location, and each content post included in a particular item in the collection is associated with a same location.

In some examples, the user account is a first user account, and the social networking system determines that a third content post of the one or more content posts was associated with the location when shared on the social networking system. The social networking system may include the third content post in the first item in the collection based at least in part on the first content post being associated with the location. In some examples, the social networking system receives a first user input from a second user account of the second group of user accounts (e.g., after the collection has been shared on the social networking system), where the first user input is in a first direction (e.g., a horizontal swipe gesture). The first user input may cause a user interface to navigate from viewing the first content post to viewing the second content post (e.g., a horizontal carousel of content posts navigated via horizontal swipe gestures). The social networking system may receive a second user input from the second user account in a second direction that is different from the first direction (e.g., a vertical swipe gesture). The second user input may cause the user interface to navigate from viewing the first item to the second item (e.g., vertical scrolling of items navigated via vertical swipe gestures).

In this way, the social networking system provides users with the ability to curate collections of content that express their point of view, and share the collections with other users. For instance, social networking system enables users, via collections, to recommend places, products, and posts on the social networking system in a way that is associated with the creating user account and easy to distribute to other user accounts.

These and other aspects are described further below with reference to the accompanying drawings. The drawings are merely an example implementation and should not be construed to limit the scope of the claims. For example, while examples are illustrated in the context of a user interface for a mobile device, the techniques may be implemented using any computing device and the user interface may be adapted to the size, shape, and configuration of the particular computing device.

Example System Architecture

FIG. 1 is a schematic view of an example computing system 100 usable to implement example techniques described herein to facilitate social network collections on an application via the system 100. In some examples, the system 100 may include users 102(1), 102(2), . . . 102(n) (collectively "users 102") to interact using computing devices 104(1), 104(2), . . . 104(m) (collectively "computing devices 104") with a social networking system 106 via a network 108. In this example, n and m are non-zero integers greater than 1.

Each of the computing devices 104 includes one or more processors and memory storing computer executable instructions to implement the functionality discussed herein attributable to the various computing devices. In some examples, the computing devices 104 may include desktop computers, laptop computers, tablet computers, mobile devices (e.g., smart phones or other cellular or mobile phones, mobile gaming devices, portable media devices, etc.), or other suitable computing devices. The computing devices 104 may execute one or more client applications, such as a web browser (e.g., Microsoft Windows Internet Explorer, Mozilla Firefox, Apple Safari, Google Chrome, Opera, etc.) or a native or special-purpose client application (e.g., social media applications, messaging applications, email applications, games, etc.), to access and view content over the network 108.

The network 108 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the computing devices 104 may access the social networking system 106 and/or communicate with one another.

The social networking system 106 may include one or more servers or other computing devices, any or all of which may include one or more processors and memory storing computer executable instructions to implement the functionality discussed herein attributable to the social networking system or digital platform. The social networking system 106 may enable its users 102 (such as persons or organizations) to interact with the social networking system 106 and with each other via the computing devices 104. The social networking system 106 may, with input from a user, create and store in the social networking system 106 a user account associated with the user. The user account may include demographic information, communication-channel information, financial information and information on personal interests of the user. The social networking system 106 may also, with input from a user, create and store a record of relationships of the user with other users of the social networking system, as well as provide services (e.g., posts, comments, photo-sharing, messaging, tagging, mentioning of other users or entities, games, etc.) to facilitate social interaction between or among the users 102.

The social networking system 106 may be configured to facilitate curation of collections of content posts shared between the users 102 via the computing devices 104.

For example, at operation 110 (indicated by "1"), a content sharing component 112 of the social networking system 106 may receive multiple content posts to be shared on the social networking system 106. In some examples, the content sharing component 112 may be part of a social network service (e.g., Facebook®, Instagram®, etc.), although other examples of services are also considered. In some cases, the content posts may be received from a user account associated with the computing device 104(1), and/or user accounts associated with any of the computing devices 104(2)-104(m). In examples, the content posts are persistent (e.g., non-ephemeral) and publicly accessible (e.g., able to be viewed by other user accounts on the social networking system regardless of whether the other user accounts are a "follower" of the user account that shared the content post). However, examples are considered in which the user account that shared a content post and/or the social networking system 106 itself may remove a content post, e.g., for violating terms of service of the social networking system 106 or at the request of the user account that shared the content post.

In some examples, one or more of the content posts may include a product for sale by a merchant. For instance, the merchant may be one of the users 102 and have a merchant user account on the social networking system 106. The merchant user account may provide the merchant with additional functionality, such as interfaces for selling products directly to consumers via the social networking system 106, interfaces for advertising on the social networking system 106, the ability to include deep links in content posts to an application associated with the merchant and installed on one or more of the computing devices 104, and the like. A content post that includes a product may include information such as a description of the product, a price of the product, a description of the merchant of the product, a link to a website of the merchant of the product, and so forth.

Alternatively or additionally, one or more of the content posts may include a location tag associated with a location. For instance, the social networking system 106 may store geographic locations associated with towns, cities, states, neighborhoods, parks, places of business (e.g., restaurants, retail stores, theaters, banks, coffee shops, government buildings, etc.), environmental features (e.g., lakes, rivers, mountains, deserts, beaches, etc.), street addresses, and the like.

At operation 114 (indicated by "2"), the content sharing component 112 of the social networking system 106 shares the multiple content posts with a first group of user accounts. In an illustrative example, a user account associated with the computing device 104(2) shares a content post via the social networking system 106. The social networking system 106 may cause the content post to appear in a feed of a user account associated with the computing device 104(1) if the user account associated with the computing device 104(1) follows the user account associated with the computing device 104(2). Additionally, in some cases, the social networking system 106 may provide the content post in an explore page, as part of a search, as part of a multi-author story (e.g., associated with a hashtag), and the like, such as to a user account associated with the computing device 104(m) who may not follow the user account associated with the computing device 104(2).

At operation 116 (indicated by "3"), a collection component 118 of the content sharing component 112 receives, from a user account associated with the computing device 104(1), a request to create a collection of one or more content posts of the multiple content posts. In some examples, the request may include one or more content posts shared by the user account associated with the computing device 104(1), and/or one or more content posts shared by user accounts associated with the computing devices 104(2)-104(m). The request to create the collection may also include a descriptor associated with the collection provided by the user 102(1). For instance, the descriptor may be a title for the collection, a statement describing the contents of the collection, or the like.

In some cases, the request may also include a descriptor, submitted by the user 102(1), associated with one (or more) of the content posts included in the collection. For example, the descriptor associated with an individual content post may be a title provided by the user 102(1) for the individual content post, a statement describing the individual content post, and so forth. The statement describing the individual content post may allow the user 102(1) to provide a point of view on individual content posts included in the collection, can describe how the content post fits in with the collection, and the like.

In examples, the request may include an indicator of a collection type for the collection. For instance, the collection type may be a product post collection type, a place post collection type, a content post collection type, and/or some other collection type. A product post collection type may correspond to a collection of product posts. A place post collection type may correspond to a collection of place posts, or content posts each having a location tag. A content post collection type may include any type of content post, and may not have restrictions (e.g., requiring a product or location tag) on content posts to be included in the collection. Examples are considered in which a collection may be multiple collection types, and/or be a collection type other than those described herein.

At operation 120 (indicated by "4"), the collection component 118 generates the collection of the one or more content posts indicated in the request. The collection component 118 may include the descriptor, such as a title or statement describing the contents of the collection, in the collection. In some cases, the collection component 118 may also include descriptors submitted by the user 102(1) related to individual content posts included in the collection, such as titles for individual content posts and/or statements describing the individual content posts. In cases in which a product post collection type was included in the request, the social networking system 106 may include information about one or more products included in the content post in the collection as well, such as a description of the product, a price of the product, a description of the merchant of the product, a link to a website of the merchant of the product, and the like. In examples in which a place post collection type was included in the request, the social networking system 106 may include the content post in an item in the collection when the location tag of the content post matches the location tag of the item in the collection.

At operation 122 (indicated by "5"), the collection component 118 provides the collection of one or more content posts to a second group of user accounts, such as user accounts associated with the computing devices 104(2)-104(m). In some examples, providing the collection may include posting the collection on a profile page of the user account associated with the computing device 104(1), where the users 102(2)-102(n) can access the collection from the profile page. For instance, a visual representation of the collection may be displayed in a thumbnail on the profile page of the user account of the user 102(1), and may include an image, a number of content posts included in the collection, the title of the collection, and so forth to give the users 102 a preview of what is included in the collection. If one of the users 102 selects the thumbnail on the profile page of the user 102(1), the collection component 118 may provide the collection to be viewed by the one of the users 102 that was viewing the profile page.

Alternatively or additionally, the collection component 118 may share a link to the collection in a feed of followers of the user account of the user 102(1), may share a link to the collection in an item of ephemeral content shared with followers of the user account of the user 102(1), and so forth. When a viewing user (e.g., the user 102(2)) selects a link to the collection in feed or in an item of ephemeral content, the collection component 118 may direct the viewing user to the collection. Further, in some examples, the users 102 may share the collection with one another, such as part of a feed post or an item of ephemeral content. For instance, the user 102(1) may select a control provided by the content sharing component 112 to share a link to the collection as an ephemeral content item. Responsive to receiving a selection of the control, the content sharing component 112 may share the link to the collection with the second group of user accounts (e.g., followers of the user account associated with the user 102(1)) as part of the ephemeral content item. Alternatively or additionally, the user 102(2) may select a control provided by the content sharing component 112 to share a link to the collection as an ephemeral content item. Responsive to receiving a selection of the control, the content sharing component 112 may share the link to the collection with a third group of user accounts (e.g., followers of the user account associated with the user 102(2)) as part of the ephemeral content item.

When one of the users 102(2)-102(n) views the collection on a computing device 104(2)-104(m), the users are presented with the content items included in the collection, and the descriptors included in the collection. Additionally, in some examples, the users 102(2)-102(n) can select individual content posts included in the collection. Responsive to receiving a selection of an individual content post, the collection component 118 directs the social network application on the device 104(2)-104(m) to the selected content post, whether the selected content post was originally shared by the user 102(1) or any of the users 102(2)-102(n).

In some examples, the users 102 may provide feedback on the collection to the user 102(1). For instance, the content sharing component 112 may provide a selectable control in a user interface on the computing devices 104 that, when selected, enables the users 102 to provide feedback on the collection. Feedback may take a variety of forms, such as "likes" of the collection, comments on the collection, expressing an emotion (e.g., using emojis) about the collection, direct messages between the users 102 regarding the collection, allowing the users 102 to save the collection for later reference, and so forth.

In some examples, the collection component 118 may associate the collection with a geographic location, such as based on a location tag of a content post included in the collection. For example, a content post may include a tagged location of a restaurant where an image of the content post was captured. The collection may be associated with the location of the restaurant, and/or a city, town, neighborhood, or the like where the restaurant is located. The tagged location may be manually added (e.g., by one of the users 102), obtained from metadata associated with a content item (e.g., a geolocation tag of a photo or video), or extracted from text in the descriptor, to name a few examples. In some cases, the content sharing component 112 may use the location associated with the collection to recommend the collection to users 102 currently in or nearby the location of the collection (e.g., based on location data received from the devices 104), to recommend the collection for users 102 searching for a particular location, and so forth.

As noted above, the collection may include one or more content posts that were previously shared by user accounts other than the user account associated with the user 102(1). When the collection is shared as described above, the collection component 118 may notify a user 102(2) (other than the user 102(1) who shared the collection) that a content post originally shared by the user 102(2) was included in a collection shared by the user 102(1). For example, the collection component 118 may send a notification to a social networking application on the computing device 104(2) associated with the user account that originally shared the content post that the content post is being used in a collection curated by the user 102(1), may send a push notification to the computing device 104(1), may send a text message notification to the computing device 104(1), or the like.

In some cases, when a collection includes a content post that was previously shared by another user account than the user account associated with the user 102(1), the other user account may want the content post removed from the collection. Therefore, the collection component 118 may receive, from a user account that originally shared a content post included in the collection, a selection of a control to remove the content post from the collection. Responsive to receiving the selection of the control, the collection component 118 may remove the content post from the collection, but in some cases may leave the original content post otherwise unaffected as shared by the user account as in operations 110 and 114.

In some examples, the social networking system 106 may provide privacy features to the users 102 while interacting with the social networking system 106. In particular examples, one or more objects (e.g., content or other types of objects) of the computing system 100 may be associated with one or more privacy settings. The one or more objects may be stored on or otherwise associated with any suitable computing system or application, such as, for example, the social networking system 106, a client system, a third-party system, a social networking application, a messaging application, a photo-sharing application, or any other suitable computing system or application. Although the examples discussed herein are in the context of an online social network, these privacy settings may be applied to any other suitable computing system. Privacy settings (or "access settings") for an object or item of content may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" and/or a "restricted list" of users or other entities that should not be allowed to access certain information associated with the object. In particular examples, the blocked list may include third-party entities. The blocked list or restricted list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular examples, privacy settings may be based on one or more nodes or edges of a social graph. A privacy setting may be specified for one or more edges or edge-types of the social graph, or with respect to one or more nodes or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a user 102(1) may share an object to the social networking system 106. The object may be associated with a concept node connected to a user node of the user 102(1) by an edge. The user 102(1) may specify privacy settings that apply to a particular edge connecting to the concept node of the object, or may specify privacy settings that apply to all edges connecting to the concept node. In some examples, the user 102(1) may share a set of objects of a particular object-type (e.g., a set of images). The user 102(1) may specify privacy settings with respect to all objects associated with the user 102(1) of that particular object-type as having a particular privacy setting (e.g., specifying that all images posted by the user 102(1) are visible only to friends of the user and/or users tagged in the images).

In particular examples, the social networking system 106 may present a "privacy wizard" (e.g., within a webpage, a module, one or more dialog boxes, or any other suitable interface) to the user 102(1) to assist the user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the social networking system 106 may offer a "dashboard" functionality to the user 102(1) that may display, to the user 102(1), current privacy settings of the user 102(1). The dashboard functionality may be displayed to the user 102(1) at any appropriate time (e.g., following an input from the user 102(1) summoning the dashboard functionality, following the occurrence of a particular event or trigger action). The dashboard functionality may allow the user 102(1) to modify one or more of the user's current privacy settings at any time, in any suitable manner (e.g., redirecting the user 102(1) to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, one or more servers of the social networking system 106 may be authorization/privacy servers for enforcing privacy settings. In response to a request from the user 102(1) (or other entity) for a particular object stored in a data store, the social networking system 106 may send a request to the data store for the object. The request may identify the user 102(1) associated with the request and the object may be sent only to the user 102(1) (or a client system of the user) if the authorization server determines that the user 102(1) is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular examples, an object may represent content that is visible to a user through a newsfeed of the user. As an example and not by way of limitation, one or more objects may be visible to a user's "Trending" page. In particular examples, an object may correspond to a particular user. The object may be content associated with the particular user, or may be the particular user's account or information stored on the social networking system 106, or other computing system. As an example and not by way of limitation, the user 102(1) may view one or more other users 102(2) . . . 102(n) of an online social network through a "People You May Know" function of the online social network, or by viewing a list of friends of the user 102(1). As an example and not by way of limitation, the user 102(1) may specify that they do not wish to see objects associated with a particular other user (e.g., the user 102(2)) in their newsfeed or friends list. If the privacy settings for the object do not allow it to be surfaced to, discovered by, or visible to the user 102(1), the object may be excluded from the search results. Although this disclosure describes enforcing privacy settings in a particular manner, this disclosure contemplates enforcing privacy settings in any suitable manner.

In particular examples, different objects of the same type associated with a user may have different privacy settings. Different types of objects associated with a user may also have different types of privacy settings. As an example and not by way of limitation, the user 102(1) may specify that the user's status updates are public, but any images shared by the user are visible only to the user's friends on the online social network. In some examples, the user 102(1) may specify different privacy settings for different types of entities, such as individual users, friends-of-friends, followers, user groups, or corporate entities. In some examples, the user 102(1) may specify a group of users that may view videos posted by the user 102(1), while keeping the videos from being visible to the user's employer. In particular examples, different privacy settings may be provided for different user groups or user demographics. As an example and not by way of limitation, the user 102(1) may specify that other users who attend the same university as the user 102(1) may view the user's pictures, but that other users who are family members of the user 102(1) may not view those same pictures.

In particular examples, the social networking system 106 may provide one or more default privacy settings for each object of a particular object-type. A privacy setting for an object that is set to a default may be changed by a user associated with that object. As an example and not by way of limitation, all images posted by the user 102(1) may have a default privacy setting of being visible only to friends of the first user and, for a particular image, the user 102(1) may change the privacy setting for the image to be visible to friends and friends-of-friends.

In particular examples, privacy settings may allow the user 102(1) to specify (e.g., by opting out, by not opting in) whether the social networking system 106 may receive, collect, log, or store particular objects or information associated with the user 102(1) for any purpose. In particular examples, privacy settings may allow the user 102(1) to specify whether particular applications or processes may access, store, or use particular objects or information associated with the user. The privacy settings may allow the user 102(1) to opt in or opt out of having objects or information accessed, stored, or used by specific applications or processes. The social networking system 106 may access such information in order to provide a particular function or service to the user 102(1), without the social networking system 106 having access to that information for any other purposes. Before accessing, storing, or using such objects or information, the social networking system 106 may prompt the user 102(1) to provide privacy settings specifying which applications or processes, if any, may access, store, or use the object or information prior to allowing any such action. As an example and not by way of limitation, the user 102(1) may transmit a message to the user 102(2) via an application related to the online social network (e.g., a messaging app), and may specify privacy settings that such messages should not be stored by the social networking system 106.

In particular examples, the user 102(1) may specify whether particular types of objects or information associated with the user 102(1) may be accessed, stored, or used by the social networking system 106. As an example and not by way of limitation, the user 102(1) may specify that images sent by the user 102(1) through the social networking system 106 may not be stored by the social networking system 106. In some examples, the user 102(1) may specify that messages sent from the user 102(1) to another user 102(2) may not be stored by the social networking system 106. In some cases, the user 102(1) may specify that all objects sent via a particular application may be saved by the social networking system 106.

In particular examples, privacy settings may allow the user 102(1) to specify whether particular objects or information associated with the user 102(1) may be accessed from particular client systems or third-party systems. The privacy settings may allow the user 102(1) to opt in or opt out of having objects or information accessed from a particular device (e.g., the phone book on a user's smart phone), from a particular application (e.g., a messaging app), or from a particular system (e.g., an email server). The social networking system 106 may provide default privacy settings with respect to each device, system, or application, and/or the user 102(1) may be prompted to specify a particular privacy setting for each context. As an example and not by way of limitation, the user 102(1) may utilize a location-services feature of the social networking system 106 to provide recommendations for restaurants or other places in proximity to the user 102(1). The default privacy settings of the user 102(1) may specify that the social networking system 106 may use location information provided from the computing device 104(1) of the user 102(1) to provide the location-based services, but that the social networking system 106 may not store the location information of the user 102(1) or provide it to any third-party system. The user 102(1) may then update the privacy settings to allow location information to be used by a third-party image-sharing application in order to geo-tag photos.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. In some examples, a company may post content related to a product release ahead of the official launch, and specify that the content may not be visible to other users until after the product launch.

In particular examples, for particular objects or information having privacy settings specifying that they are ephemeral, the social networking system 106 may be restricted in its access, storage, or use of the objects or information. The social networking system 106 may temporarily access, store, or use these particular objects or information in order to facilitate particular actions of a user associated with the objects or information, and may subsequently delete the objects or information, as specified by the respective privacy settings. As an example and not by way of limitation, the user 102(1) may transmit a message to the user 102(2), and the social networking system 106 may temporarily store the message in a data store until the user 102(2) has viewed or downloaded the message, at which point the social networking system 106 may delete the message from the data store. In some examples, continuing with the prior example, the message may be stored for a specified period of time (e.g., 2 weeks), after which point the social networking system 106 may delete the message from the data store.

In particular examples, changes to privacy settings may take effect retroactively, affecting the visibility of objects and content shared prior to the change. As an example and not by way of limitation, the user 102(1) may share a first image and specify that the first image is to be public to all other users. At a later time, the user 102(1) may specify that any images shared by the user 102(1) should be made visible only to a first user group. The social networking system 106 may determine that this privacy setting also applies to the first image and make the first image visible only to the first user group. In particular examples, the change in privacy settings may take effect only going forward. Continuing the example above, if the user 102(1) changes privacy settings and then shares a second image, the second image may be visible only to the first user group, but the first image may remain visible to all users. In particular examples, in response to a user action to change a privacy setting, the social networking system 106 may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the social networking system 106 may determine that user 102(1) may want to change one or more privacy settings in response to a trigger action associated with the user 102(1). The trigger action may be any suitable action on the online social network. As an example and not by way of limitation, a trigger action may be a change in the relationship between a first and second user of the online social network (e.g., "un-friending" a user, changing the relationship status between the users, etc.). In particular examples, upon determining that a trigger action has occurred, the social networking system 106 may prompt the user 102(1) to change the privacy settings regarding the visibility of objects associated with the user 102(1). The prompt may redirect the user 102(1) to a workflow process for editing privacy settings with respect to one or more entities associated with the trigger action. The privacy settings associated with the user 102(1) may be changed only in response to an explicit input from the user 102(1), and may not be changed without the approval of the user 102(1). As an example and not by way of limitation, the workflow process may include providing the user 102(1) with the current privacy settings with respect to the user 102(2) or to a group of users (e.g., un-tagging the user 102(1) or the user 102(2) from particular objects, changing the visibility of particular objects with respect to the user 102(2) or a group of users), and receiving an indication from the user 102(1) to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social networking system 106 may determine that such action may be sensitive and may prompt the user to confirm that his or her relationship status should remain public before proceeding. In some examples, a user's privacy settings may specify that the user's posts are visible only to friends of the user. However, if the user changes the privacy setting for his or her posts to being public, the social networking system 106 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example and not by way of limitation, the social networking system 106 may send a reminder to the user to confirm his or her privacy settings every six months or after every ten photo posts. In particular examples, privacy settings may also allow users to control access to the objects or information on a per-request basis. As an example and not by way of limitation, the social networking system 106 may notify the user whenever a third-party system attempts to access information associated with the user, and require the user to provide verification that access should be allowed before proceeding.

Figure 2:
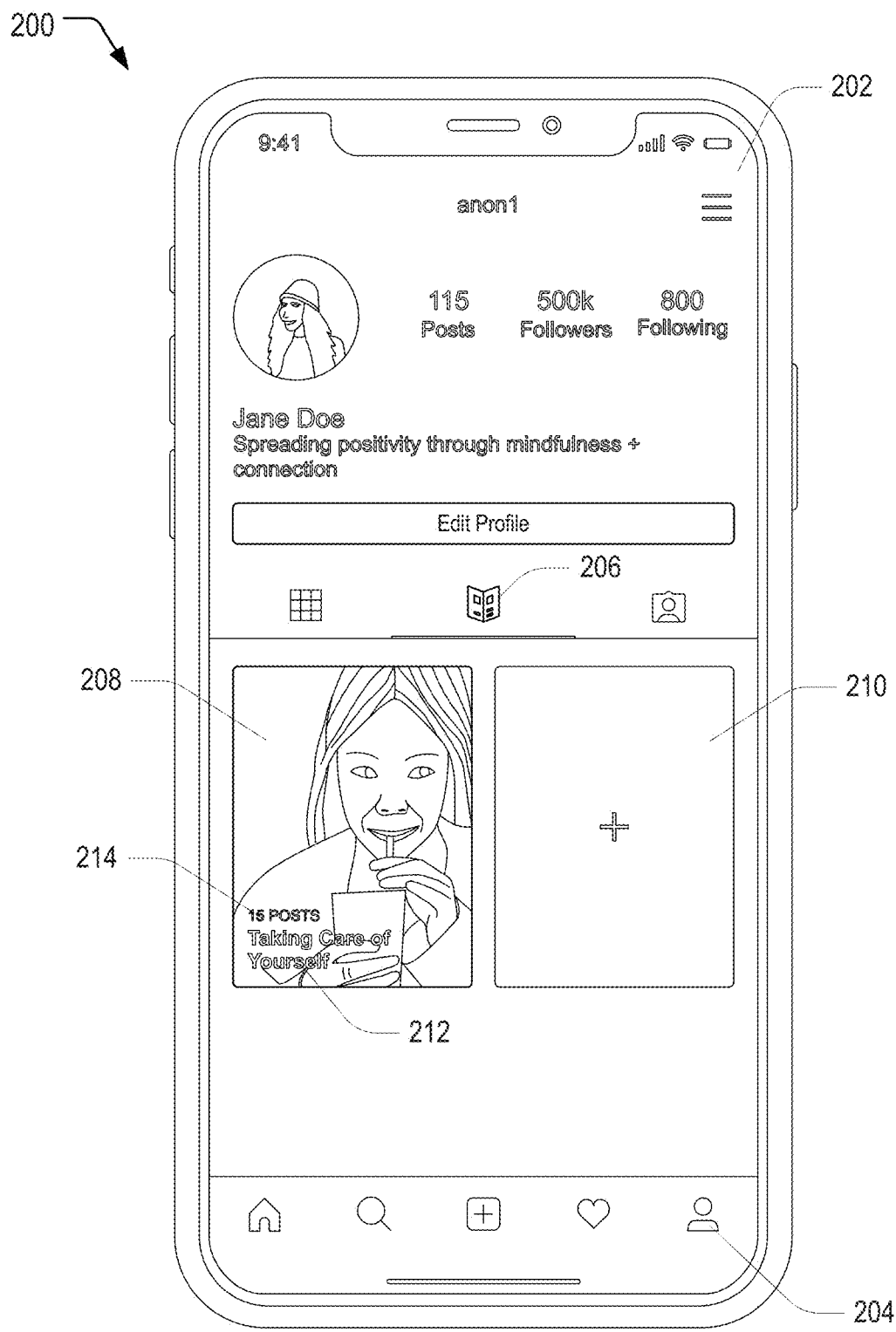
FIG. 2 is an example user interface that is usable to create a collection of one or more content posts using the techniques described herein.

FIG. 2 is an example device 200 including an example of a user interface 202 that is usable to create a collection of one or more content posts using the techniques described herein. The device 200 may correspond to the device 104(1) of FIG. 1. The user interface 202 may be presented to a user 102(1) in response to selection of a control 204 to view a profile of a user account created by the user 102(1), followed by selection of a control 206 to view collections created by the user 102(1) in association with the user account.

The user interface 202 includes a thumbnail 208 indicating a collection has been created by the user 102(1), and a control 210 that enables the user to create an additional collection. In the illustrated example, the thumbnail 208 includes an image associated with the collection, a descriptor 212 that provides a title for the collection, and a descriptor 214 that indicates a number of content posts included in the collection. Other information may be included in the thumbnail 208 as well. While only one thumbnail 208 representing one collection is illustrated in the user interface 202, any number of collections may be included in the user interface 202 associated with the profile of the user account, such as based on the number of collections that the user 102(1) has created.

Figure 3:
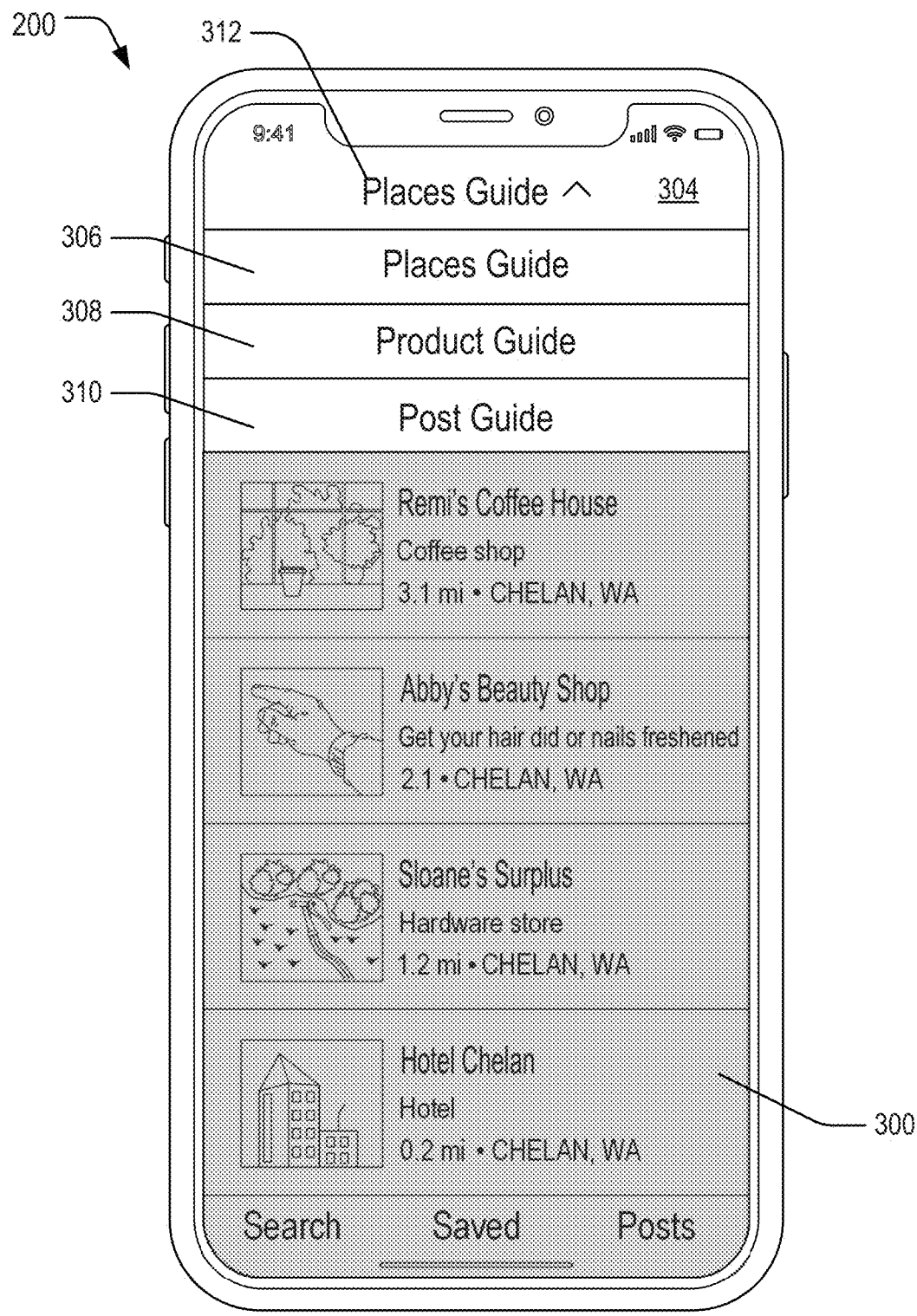
FIG. 3 is an example user interface that is usable to select a type of collection of one or more content posts using the techniques described herein.

FIG. 3 is the example device 200 including an example of a user interface 300 that is usable to select a type of collection for one or more content posts. In some examples, the user interface 300 may be presented in response to selection of the control 210 in the user interface 202 to create a new collection, and/or a similar control presented in a user interface associated with posts the user has saved, posts the user has previously shared, posts displayed to the user as a result of a search, and so forth. The user interface 300 includes a menu 304 of collection types that the user may select to generate a collection. For example, the menu 304 includes a "Places Guide" control 306 which may correspond to a place post collection type, "Product Guide" control 308 which may correspond to a product post collection type, and "Post Guide" control 310 which may correspond to a content post collection type. An icon 312 indicates a currently selected collection type for the collection, in this case a place post collection type as indicated by "Places Guide." Other configurations for the menu 304 are also considered, such as radio buttons, check boxes, cycle buttons, a list box, a spinner, and the like.

In some examples, the social networking system 106 may associate a collection with a single category collection type. For instance, if a user selects the "Places Guide" control 306, the collection created subsequent to this selection may be subject to rules specific to the place post collection type, while selecting the "Products Guide" control 308 causes a subsequently-created collection to be subject to rules specific to the product post collection type, and the "Post Guide" control 310 causes a subsequently-created collection to be subject to rules specific to the content post collection type. For example, the product post collection type may require that a previously shared content post selected to be incorporated into the collection include at least one product tagged in the content post that is available for purchase, such as functionality to purchase directly via the social networking system 106, a deep link to an application of the merchant where the product may be purchased, a link to a website to be viewed in a browser where the product may be purchased, and so forth.

The product post collection type may, in some cases, cause functionality associated with product posts to be enabled, such as by displaying characteristics of one or more products indicated in a product post. Examples of characteristics associated with products that may be included in a product post in a collection may include, but are not limited to, a product description, a price of a product, a description of a merchant selling the product(s), a link to a website for the merchant, and so forth. In an illustrative example, a user viewing a product post in a collection of the product post collection type may tap an image included in the product post depicting the product, and in response, a price and product description may appear overlaying the product in the image. In some cases, the characteristics may be carried over into the collection from the original post, such as the original post as shared by a merchant. Accordingly, characteristics may provide users viewing the collection with information about the products included in the collection directly from the merchant (e.g., as included in the previously shared post), such that the user that created the collection is not required to repopulate the post included in the collection with this information.

In some examples, the place post collection type may require that content posts included in the collection be tagged with at least one location. For instance, the social networking system 106 may store geographic locations associated with towns, cities, states, neighborhoods, parks, places of business (e.g., restaurants, retail stores, theaters, banks, coffee shops, government buildings, etc.), environmental features (e.g., lakes, rivers, mountains, deserts, beaches, etc.), street addresses, and the like. When receiving a post on the social networking system 106 according to the operation 110 of FIG. 1, the social networking system 106 may receive a location tag associated with the content post, which may indicate a location that the user wants to associate with the content post, such as where an image or video was taken. The social networking system 106 may include the location with the content post when the content post is shared according to the operation 114 of FIG. 1, such that the users 102 can view the location associated with the content post.

In response to receiving a selection of the "Places Guide" control 306, the social networking system 106 may restrict content posts that can be included in the collection to content posts that included a location tag when previously shared on the social networking system 106. Further, in some cases, the social networking system 106 may organize the collection based at least in part different locations included in the collection. For example, the social networking system 106 may limit an item included in a collection to a particular location, and allow the user to include multiple content posts associated with the location in the item of the collection. The user may include multiple items, each corresponding to respective locations, in the content post.

In an illustrative example, the social networking system 106 may receive a location, such as Seattle, Wash., from the user 102(1) in the request to create the collection as described in relation to the operation 116 of FIG. 1. The social networking system 106 may determine whether the one or more content posts that the user 102(1) has included in the request include a "Seattle, Wash." location tag. If the social networking system 106 determines that the one or more content posts that the user 102(1) has included in the request include a "Seattle, Wash." location tag, the social networking system 106 may include these content posts together in an item of the collection. If the social networking system 106 determines that the one or more content posts that the user 102(1) has included in the request do not include a "Seattle, Wash." location tag, the social networking system 106 may include these content posts in a different item of the collection, or in some cases may exclude these content posts from being included in the collection. In some examples, if there are multiple content posts that the user 102(1) has selected to be included in the collection having the same location tag, the multiple content posts with the same location tag may be included in a same item within the collection associated with the location.

Although the description of FIG. 3 provides examples of a collection being associated with a single collection type, examples are also considered in which the collection may be associated with multiple collection types, and/or different collection types than those described here. For example, a collection may be associated with a product post collection type and a place post collection type, and may include one or more product posts along with one or more place posts in the collection. In some cases, collections of more than one collection type may incorporate functionality described herein associated with the different collection types into a single collection.

Figure 4:
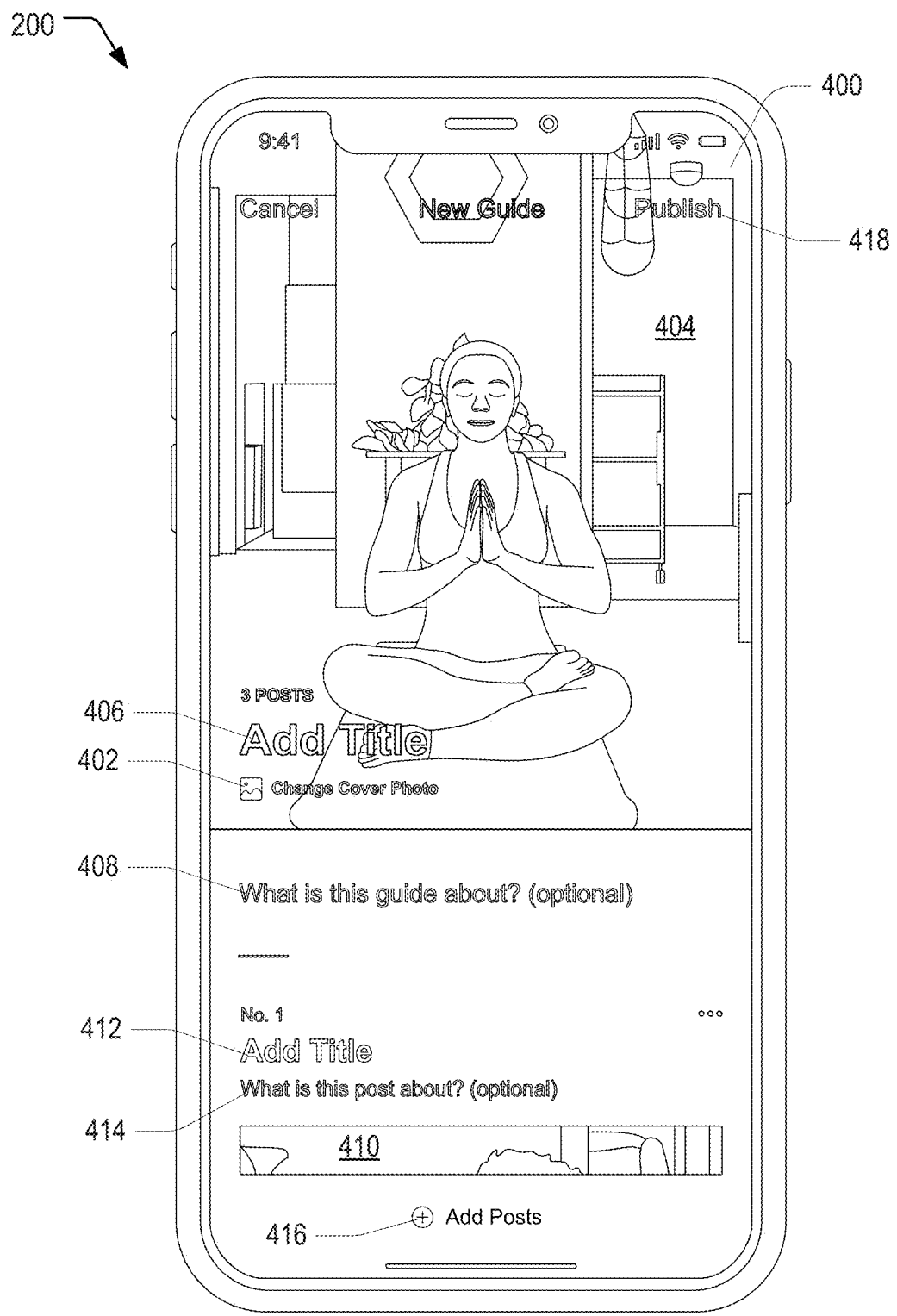
FIG. 4 is an example user interface that is usable to customize a collection of one or more content posts using the techniques described herein.

FIG. 4 is the example device 200 including an example of a user interface 400 that is usable to customize a collection of one or more content posts using the techniques described herein. For instance, the user interface 400 may be presented in response to selection of the control 210 in the user interface 202 to create a new collection, and/or the "Post Guide" control 310 in the user interface 302 to create a collection of the content post collection type. The user interface 400 includes a control 402 that, when selected, enables the user 102(1) to change a cover image 404 associated with the collection. In some examples, the user 102(1) may select the control 402 to add an image from storage on the device 200, from content posts shared by the user 102(1) on the social network application, from one of the content posts included in the collection, and so forth.

In examples, the user interface 400 also includes an indicator 406 that, when selected, enables the user 102(1) to provide a title descriptor for the collection. For example, upon selection of the indicator 406 (or any of the indicators described herein), an input mechanism such as a keyboard, microphone, or the like may be presented in the user interface 400 that allows the user 102(1) to supply a title descriptor for the collection. The user interface 400 may include an indicator 408 that, when selected, enables the user 102(1) to provide a statement describing the collection, such as a theme of the collection, why the user 102(1) created the collection, how to use the content posts included in the collection, where to find the content posts included in the collection, who inspired the collection, what is included in the collection, and the like.

Additionally, the user interface 400 includes a content post 410 that the user 102(1) has added to be included in the collection. As noted above, the content post 410 may have been previously shared by the user 102(1) that is creating the collection, or one of the other users 102(2)-102(n). In some examples, the content post 410 includes an image or video shared prior to the user 102(1) generating the collection. The user interface 400 may include an indicator 412 that, when selected, enables the user 102(1) to provide a title descriptor for the content post 410, and/or an indicator 414 that enables the user 102(1) to provide a statement describing the content post 410. In this way, the user 102(1) can provide their own point of view regarding the content post 410, such as how the user 102(1) used a product mentioned in the content post 410, a time of day that the user 102(1) visited a location in the content post 410, how the user 102(1) felt about content included in the content post 410, and so on.

In some examples, the user interface 400 includes a control 416 that, when selected, allows the user 102(1) to add additional content posts to the collection, either from content posts previously shared by the user 102(1) or content posts shared by other users 102(2)-102(n). The user interface 400 may include a control 418 that enables the user 102(1) to publish the collection, e.g., to share the collection with other users 102(2)-102(n). Selection of the control 418 may also cause the collection to be displayed on a profile page of a user account associated with the user 102(1).

The content post collection type may allow users to share content posts of different types (e.g., both product posts and place/location posts) without the restrictions associated with the product post collection type and/or the place post collection type. For example, the content post collection type may not require content posts included in the collection to include a location tag and/or a product for sale. Alternatively or additionally, some functionality associated with the product post collection type and/or the place post collection type may or may not be available to the content post collection type. For instance, a content post in a collection of the content post collection type may provide users who view the collection with characteristics of a product included in a content post, but may not allow for multiple content posts to be included in a same item in the collection.

Figure 5:
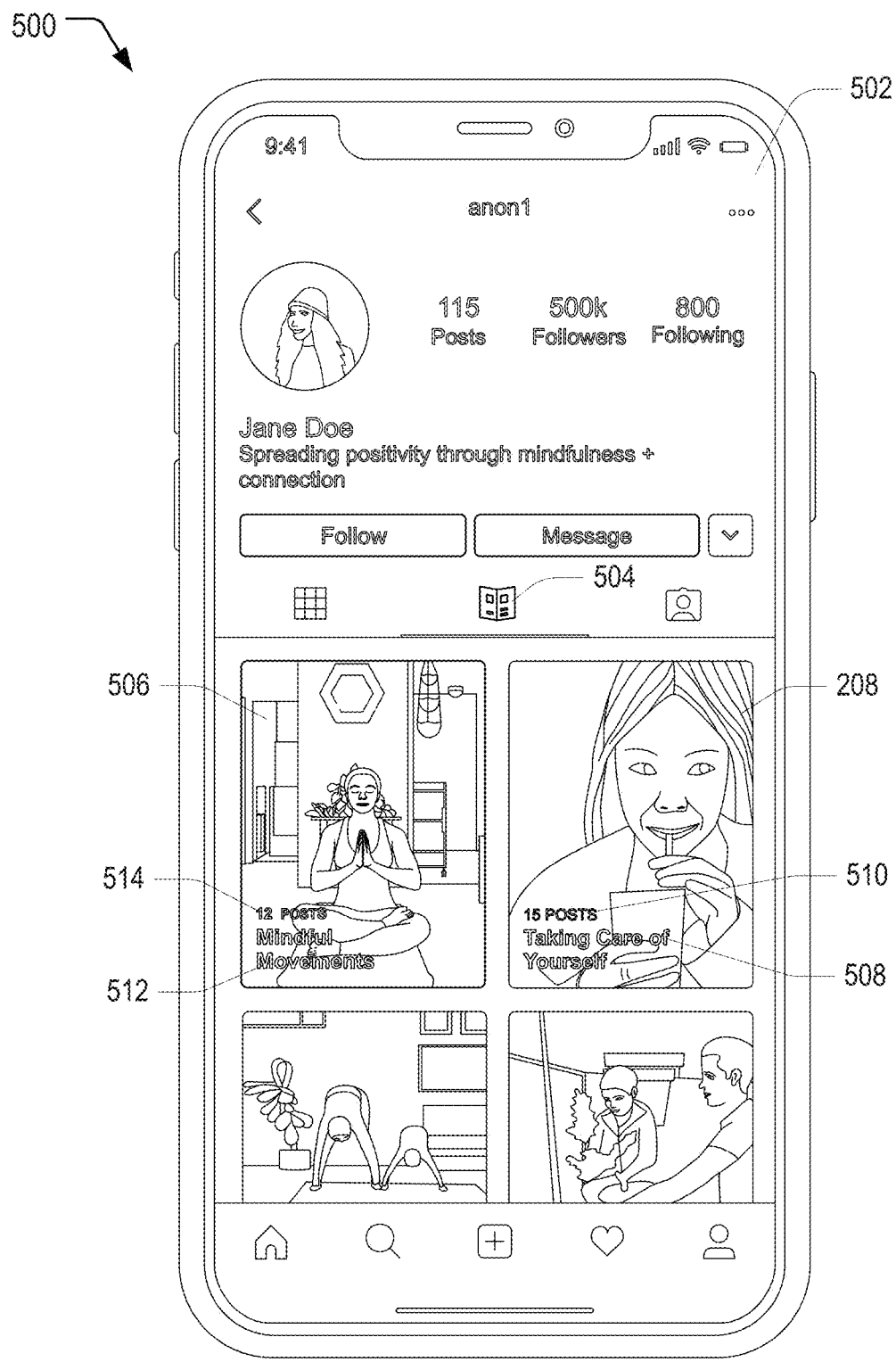
FIG. 5 is an example user interface that is usable to display, in association with a user account, one or more collections each comprising one or more content posts using the techniques described herein.

FIG. 5 is an example device 500 including an example of a user interface 502 that is usable to display, in association with a user account, one or more collections each comprising one or more content posts using the techniques described herein. For instance, the example device 500 may be any of the computing devices 104(2)-104(m). The user interface 502 may correspond to what is displayed when one of the users 102(2)-102(n) selects to view a profile page of the user 102(1), and selects a control 504 that corresponds to collections created by the user account associated with the user 102(1).

The user interface 502 includes the thumbnail 208 of FIG. 2 corresponding to a collection created by the user 102(1). The user 102(2) may select the thumbnail 208 to view a collection of content posts associated with the thumbnail. The user interface 502 also includes a thumbnail 506 corresponding to a collection created by the user 102(1) upon selection of the control 418 to publish the collection. The thumbnail 208 includes a descriptor 508, such as a title descriptor, for the collection, and a descriptor 510 that indicates a number of content posts included in the collection. In examples in which the collection is of the place post collection type, the descriptor 510 may identify the place post collection type, such as by "15 Places." Alternatively or additionally, if the collection of the product post collection type, the descriptor 510 may identify the product post collection type by "15 Products." Similarly, the thumbnail 506 includes a descriptor 512, such as a title descriptor, for the collection, and a descriptor 514 that indicates a number of content posts (or places or products, as just described) included in the collection. The user 102(2) may select the thumbnail 208 or the thumbnail 506 to view additional details of the respective collections, such as content posts included in the respective collections, additional descriptors provided by the user 102(1) about the respective collections, and so forth.

Figure 6:
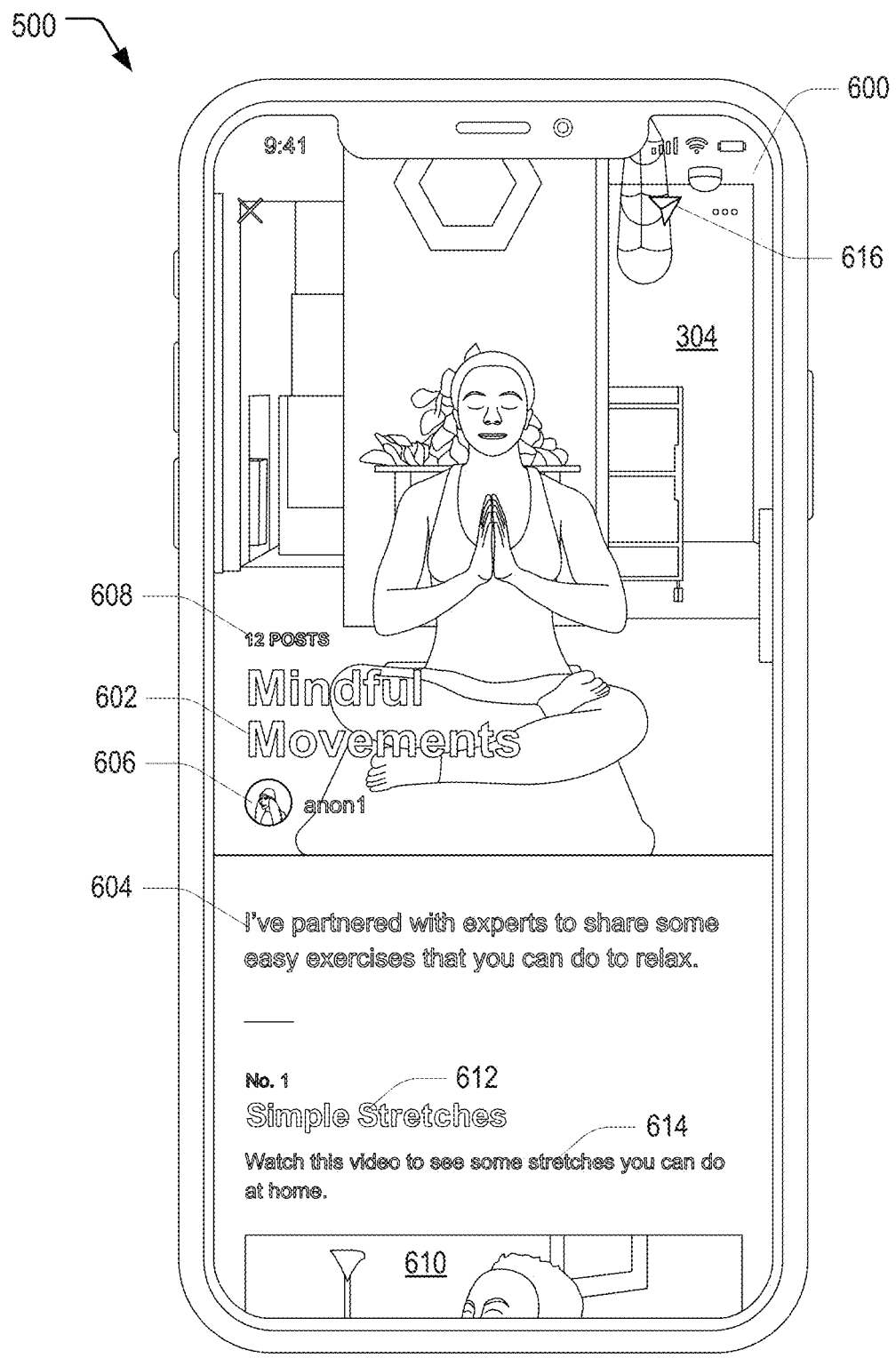
FIG. 6 is an example user interface that is usable to present a shared collection of one or more content posts using the techniques described herein.

FIG. 6 is the example device 500 including an example of a user interface 600 that is usable to present a shared collection of one or more content posts using the techniques described herein. For instance, the user interface 600 may be presented on the device 500 in response to selection by the user 102(2) of the thumbnail 506 to view the collection associated with the thumbnail 506. The user interface 600 includes the cover image 404 that was selected by the user 102(1) for the collection, as described in relation to FIG. 4. The user interface 600 may also include a descriptor 602, such as a title descriptor for the collection, provided by the user 102(1) in association with the collection, and a descriptor 604 that is a statement describing the collection. In some examples, user interface 600 includes an account identifier 606 associated with the user account of the user 102(1) that created the collection. The user interface 600 may further include a descriptor 608 that indicates a number of content posts (or places or products, as previously described) included in the collection.

In some examples, the user interface 600 includes a content post 610, which may comprise an image or a video shared by the user 102(1) or another one of the users 102(2)-102(n) prior to creation of the collection. The content post 610 may include a descriptor 612, such as a title descriptor for the content post 610, and/or a descriptor 614 that provides a statement by the user 102(1) about the content post 610. The user 102(2) may select the content post 610 in the user interface to be directed to the original source of the content post 610. In some cases, the user interface 600 includes a control 616 that, when selected, provides a mechanism for the user 102(2) to share a link to the collection with one or more other users, such as a direct message, as an item of ephemeral content, and so forth.

Figure 7:
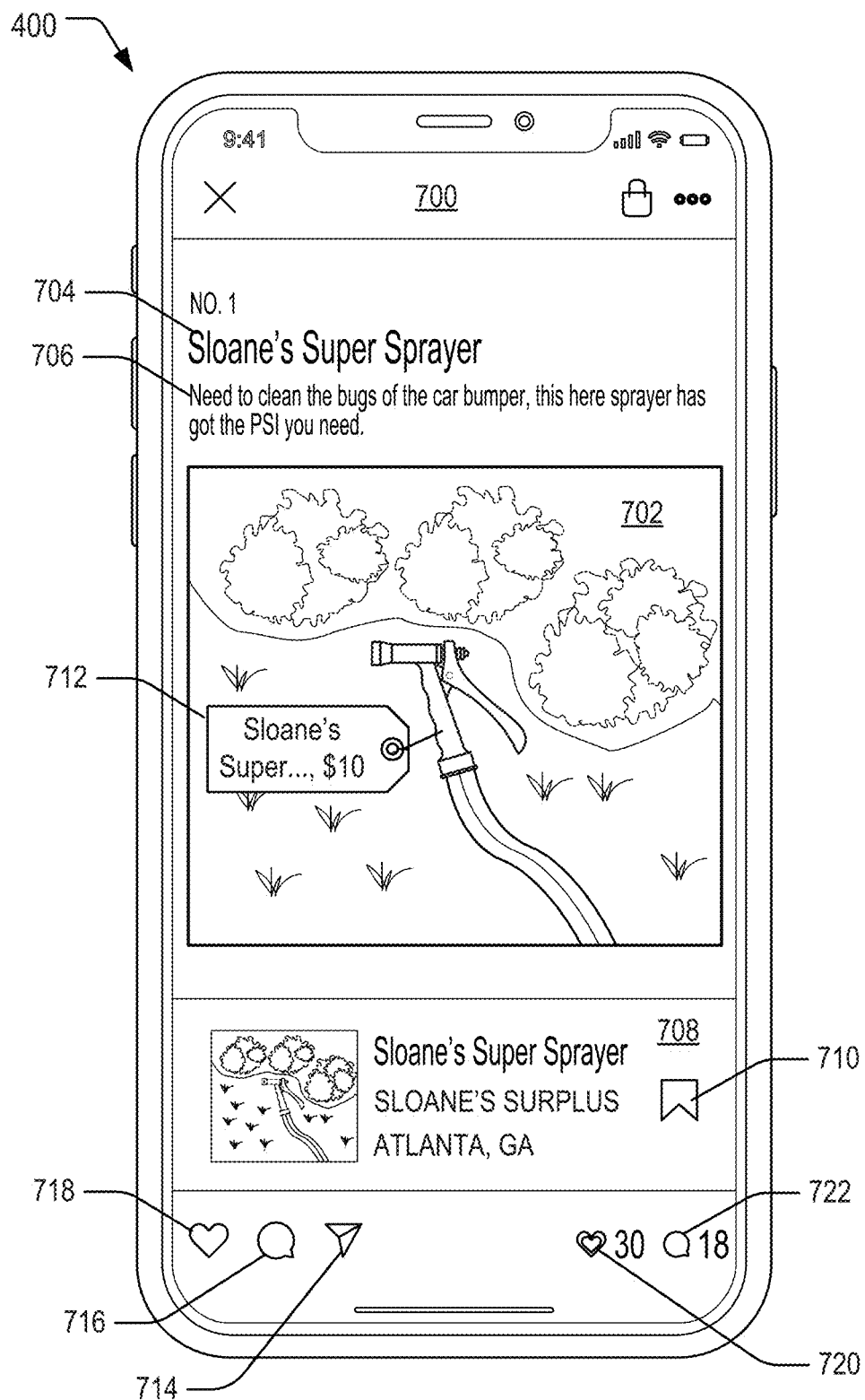
FIG. 7 is an example user interface that is usable to present a shared collection of one or more product posts using the techniques described herein.

FIG. 7 is the example device 500 including an example user interface 700 that is usable to present a shared collection of one or more product posts. For instance, the user interface 700 may be presented on the device 500 in response to selection by the user 102(2) of a thumbnail to view a collection associated with the thumbnail, where the thumbnail indicated that the collection was of the product post collection type. In some examples, the user interface 700 includes a content post 702, which may comprise an image or a video shared by the user 102(1) or another one of the users 102(2)-102(n) prior to creation of the collection. Because the collection illustrated in the user interface 700 is of the product post collection type, the content post 702 may be a product post that provides information related to a particular product, features to purchase the product, and the like.

The content post 702 may include a descriptor 704, such as a title descriptor for the content post 702, and/or a descriptor 706 that provides a statement by the user 102(1) about the product included in the content post 702. The user 102(2) may select the content post 702 (e.g., via a touch input) in the user interface 700 to be directed to the original source of the content post 702 (e.g., a merchant), to view characteristics of the product included in the product post (e.g., product description, price, description of the merchant of the product, link to a website of the merchant, etc.), to purchase the product via the social networking system 106, and the like. For example, in response to the user 102(2) selecting the image included in the content post 702 via a touch input, the social network application may display a tab 708 that includes a name of the merchant selling the product in the content post 702, a location of the merchant, and a control 710 that, when selected by the user 102(2), causes the content post 702 to be bookmarked in an account of the user 102(2) for later reference. Additionally, in some examples, the social network application may display a tag 712 (e.g., in response to the touch input) that includes a descriptor of the product included in the content post 702 and a price of the product included in the content post 702.

In some cases, the user interface 700 includes additional controls as well. For example, the user interface 700 includes a control 714 that, when selected, provides a mechanism for the user 102(2) to share a link to the collection with one or more other users, such as a direct message, as an item of ephemeral content, and so forth. The user interface 700 may include a control 716 that, when selected, provides a mechanism for the user 102(2) to comment on the collection. Additionally, in some examples, the user interface 700 includes a control 718 that, when selected, causes the user account of the user 102(2) to "like" the collection. In some examples, the user interface 700 may include an indicator 720 that displays a number of user accounts that have "liked" the collection, and/or an indicator 722 of a number of comments that have been provided on the collection.

Figure 8:
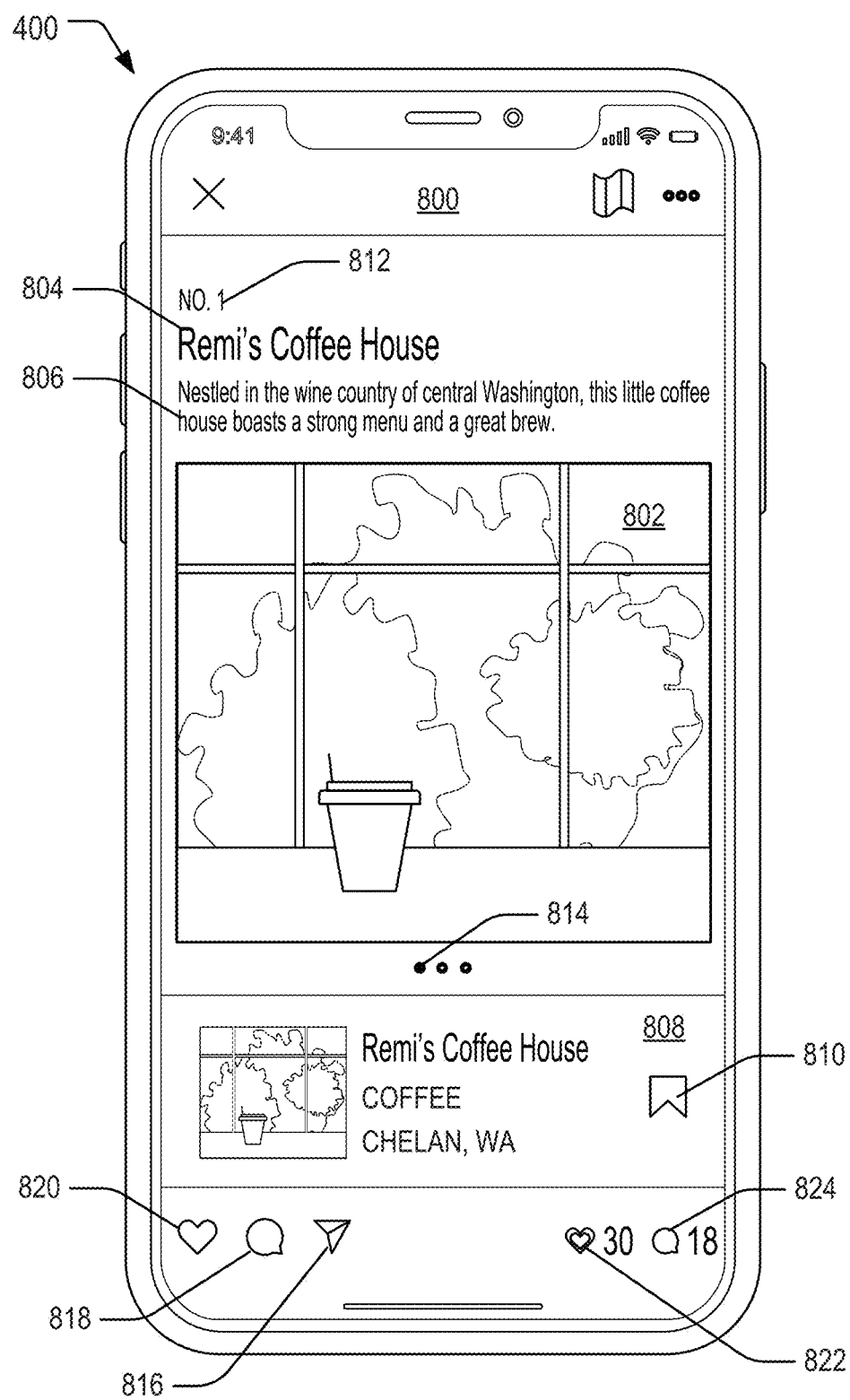
FIG. 8 is an example user interface that is usable to present a shared collection of one or more place posts using the techniques described herein.

FIG. 8 is the example device 500 including an example user interface 800 that is usable to present a shared collection of one or more place posts (also referred to as "location posts"). For instance, the user interface 800 may be presented on the device 500 in response to selection by the user 102(2) of a thumbnail to view a collection associated with the thumbnail, where the thumbnail indicated that the collection was of the place post collection type. In some examples, the user interface 800 includes a content post 802, which may comprise an image or a video shared by the user 102(1) or another one of the users 102(2)-102(n) prior to creation of the collection. Because the collection illustrated in the user interface 800 is of the place post collection type, the content post 802 may be a place post that was tagged with a location when shared on the social networking system 106.

The content post 802 may include a descriptor 804, such as a title descriptor for the content post 802, and/or a descriptor 806 that provides a statement by the user 102(1) about the location tagged in the content post 802. The user 102(2) may select the content post 802 (e.g., via a touch input) in the user interface 700 to be directed to the original source of the content post 802 (e.g., a merchant or user account), to view the location tagged in the content post 802 on a map, and the like. For example, in response to the user 102(2) selecting the image included in the content post 802 via a touch input, the social network application may display a tab 808 that includes a name of the merchant associated with the tagged location in the content post 802, the location of the merchant, and a control 810 that, when selected by the user 102(2), causes the content post 802 to be bookmarked in an account of the user 102(2) for later reference.

Additionally, in some examples, the social networking system 106 may enable the user 102(1) to share multiple content posts in an item of the collection, where each of the multiple content posts are associated with a same location. For example, the user interface 800 includes an indicator 812 that identifies which item in the collection is being viewed. When a place post collection type is selected by the user 102(1) in creating the collection, the social networking system 106 may associate each item in the collection with a different location (although examples are considered in which multiple items in a collection share a same location). In examples, the location associated with an item in the collection may determine content posts that can be included in an item, based on whether the location tag in a content post matches the location associated with the item.

When multiple content posts are associated with a same item under the indicator 812, the user interface 800 may include an indicator 814 that represents a number of content posts associated with the item and the location. In some examples, the user 102(2) may use a gesture (e.g., a horizontal swipe gesture) to navigate through the multiple content posts within the same item under the indicator 812. In response to receiving the gesture in a first direction, the social network application may display a different content post that was tagged with the location associated with the item in place of the content post 802. Additionally, in some cases, the descriptor 804 and/or the descriptor 806 may change based on inputs provided by the user 102(1) about the second content post associated with the item. The indicator 812 may remain the same in response to the gesture in the first direction, thus providing the user 102(2) with an indication that the second content post is associated with the same location as the first content post. The user interface 800 may include multiple items associated with respective locations, and the user 102(2) may navigate through the multiple items using a gesture in a second direction (e.g., a vertical swipe gesture).

Similar to the discussion above, the user interface 800 includes additional controls as well. For example, the user interface 800 includes a control 816 that, when selected, provides a mechanism for the user 102(2) to share a link to the collection with one or more other users, such as a direct message, as an item of ephemeral content, and so forth. The user interface 800 may include a control 818 that, when selected, provides a mechanism for the user 102(2) to comment on the collection. Additionally, in some examples, the user interface 800 includes a control 820 that, when selected, causes the user account of the user 102(2) to "like" the collection. In some examples, the user interface 800 may include an indicator 822 that displays a number of user accounts that have "liked" the collection, and/or an indicator 824 of a number of comments that have been provided on the collection.

Figure 9:
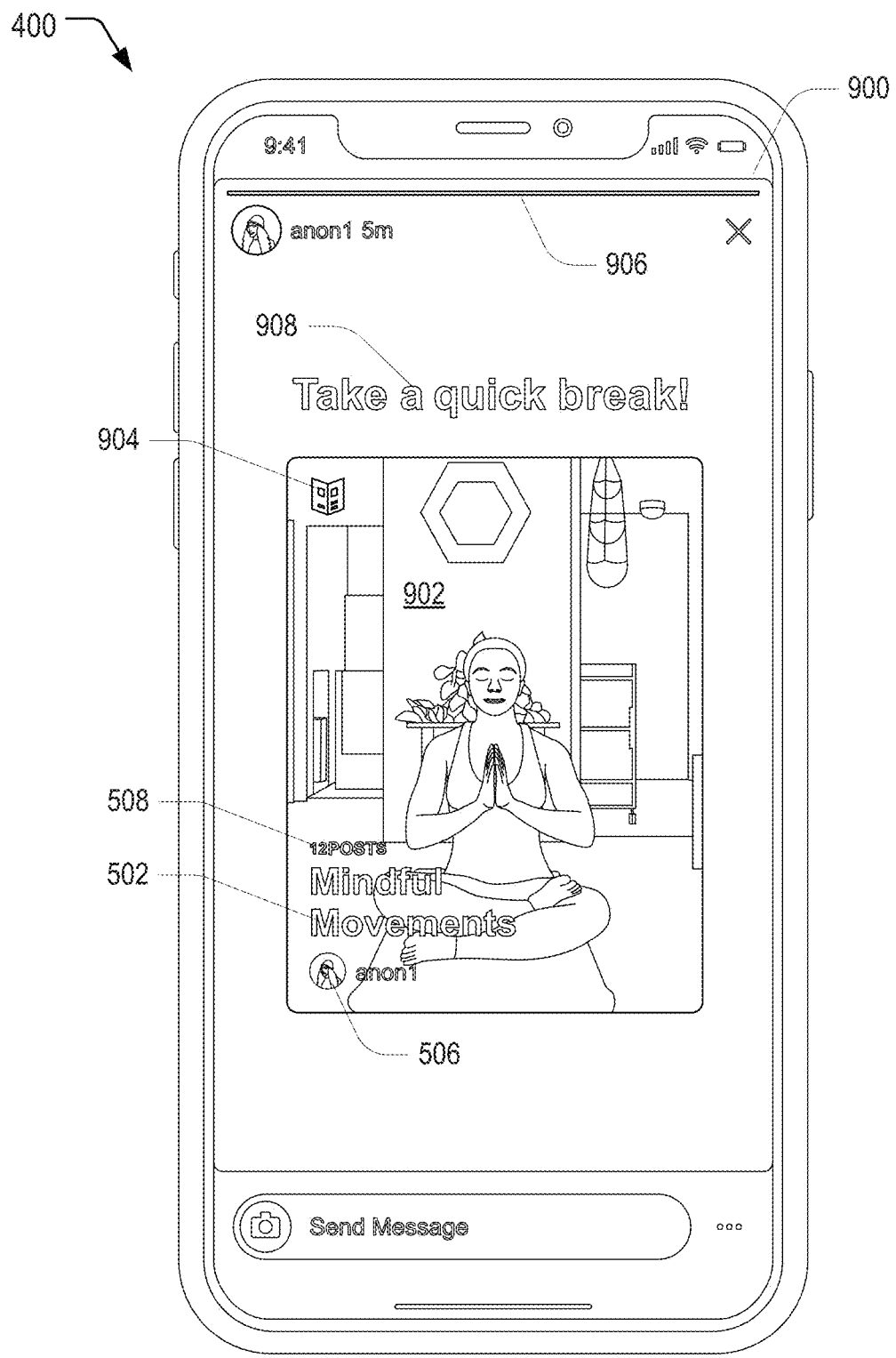
FIG. 9 is an example user interface that is usable to share a link to a collection of one or more content posts as part of an ephemeral content item using the techniques described herein.

FIG. 9 is the example device 500 including an example of a user interface 900 that is usable to share a link to a collection of one or more content posts as part of an ephemeral content item using the techniques described herein. The user interface 900 corresponds to an ephemeral content item that includes a link 902 to a collection, in this case the cover image 404 as described in relation to FIG. 4. In some cases, the user 102(2) may select the control 616 in the user interface 600 of FIG. 6 (and/or the control 714 or the control 816), to generate an ephemeral content item that includes a link to a collection. Alternatively or additionally, the user 102(1) may select a control generate an ephemeral content item that includes a link to the collection. The user interface 900 may correspond to an ephemeral content item from either of these scenarios, or other techniques for generating an ephemeral content item.

The link 902 includes an icon 904 that indicates a type of content that the user 102(2) will be directed to upon selection of the link—in this case, a collection. The link 902 may also include the descriptor 602 (e.g., the title of the collection), the descriptor 608 (e.g., a number of content posts, place posts, and/or product posts included in the collection), and/or the account identifier 606 of the user account associated with the user 102(1) that created the collection. The user interface 900 may include a progress bar 906 that indicates how long the ephemeral content item has been displayed and/or how much longer the ephemeral content item will be displayed. In some examples, the user interface 900 may include content other than the link 902 as well, such as a text overlay 908, stickers, GIFs, filters, augmented reality (AR) effects, and the like.

Figure 10:
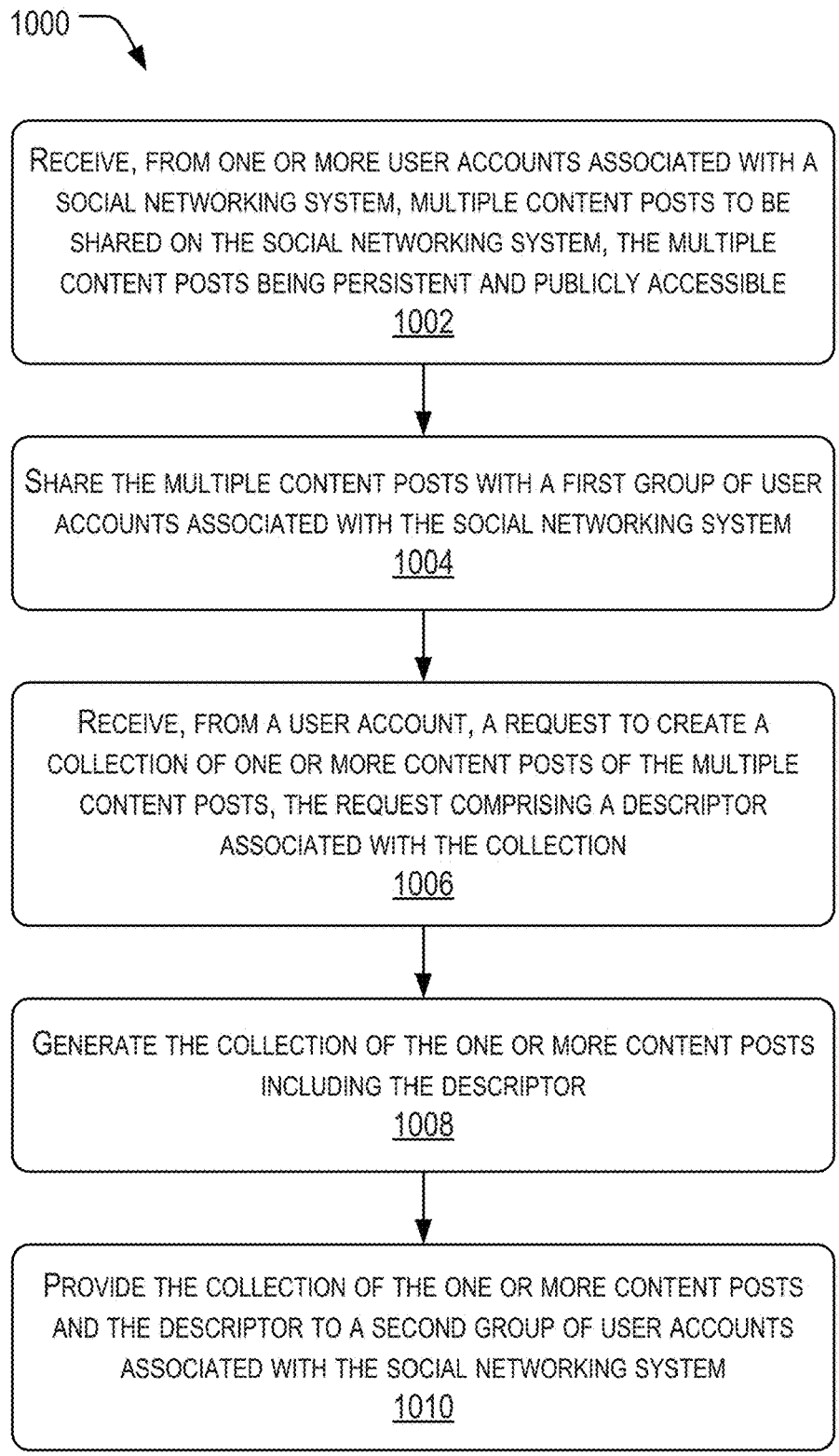
FIG. 10 illustrates a flowchart outlining an example method to generate a collection of one or more content items using the techniques described herein.

FIG. 10 illustrates an example process 1000 for generating a collection of one or more content posts using the techniques described herein. Various methods are described with reference to the example system of FIG. 1 and/or the user interfaces of FIGS. 2-9 for convenience and ease of understanding. However, the methods described are not limited to being performed using the systems of FIG. 1 or FIG. 11 and/or the user interfaces of FIGS. 2-9, and may be implemented using systems and devices other than those described herein.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

An operation 1002 includes receiving, from one or more user accounts associated with a social networking system, multiple content posts to be shared on the social networking system, where the multiple content posts are persistent and publicly accessible. In examples, the content posts being persistent corresponds to the content posts being non-ephemeral, but the content posts may be removed from the social networking system 106 due to violation of a policy of the social networking system, may be removed by the user account that originally shared the content post, and so on. Additionally, the content posts being publicly accessible corresponds to the content posts being able to be viewed by other user accounts on the social networking system regardless of whether the other user accounts are a "follower" of the user account that shared the content post. In some cases, one or more content posts of the multiple content posts may include a product for sale by a merchant, and/or a location tag indicating a location associated with the content post.

An operation 1004 includes sharing, by the social networking system, the multiple content posts with a first group of user accounts associated with the social networking system. For instance, the multiple content posts may be shared in feeds with followers of the user accounts that originally shared the content posts via the social networking system. Alternatively or additionally, the multiple content posts may be viewed by other user accounts in response to a search, on an explore or browsing page, and so forth, even if the other user account is not a follower of the user account that originally shared a content post of the multiple content posts.

An operation 1006 includes receiving, from a user account, a request to create a collection of one or more content posts of the multiple content posts, where the request comprises a descriptor associated with the collection. In some examples, the descriptor is a title and/or a statement describing the collection. Alternatively or additionally, the descriptor is a title and/or a statement describing an individual content post included in the collection, which may be received from the creator of the collection (e.g., instead of or in addition to a description provided by the user account that originally shared the content post). In examples, the request may indicate a collection type for the collection as well. For instance, the collection type may be a product post collection type, a place post collection type, a content post collection type, and/or some other collection type.

An operation 1008 includes generating, by the social networking system, the collection of the one or more content posts including the descriptor. In cases in which a product post collection type was included in the request, the social networking system 106 may include information about one or more products included in the content post in the collection as well, such as a description of the product, a price of the product, a description of the merchant of the product, a link to a website of the merchant of the product, and the like. In examples in which a place post collection type was included in the request, the social networking system 106 may include the content post in an item in the collection when the location tag of the content post matches the location tag of the item in the collection.

An operation 1010 includes providing, by the social networking system, the collection of the one or more content posts and the descriptor to a second group of user accounts associated with the social networking system. In some examples, providing the collection may include posting the collection on a profile page of the user account that shared the collection, where other users can access the collection from the profile page. For instance, a visual representation of the collection may be displayed in a thumbnail on the profile page of the user account that shared the collection, and may include an image, a number of content posts included in the collection, the title of the collection, and so forth to give other users a preview of what is included in the collection. If one of the other users selects the thumbnail on the profile page of the user that shared the collection, the collection component 118 may provide the collection to be viewed by a user that is viewing the profile page. Alternatively or additionally, the collection component 118 may share a link to the collection in a feed of followers of the user account of the user that created the collection, may share a link to the collection in an item of ephemeral content as described above, and so forth.

Example System and Device

Figure 11:
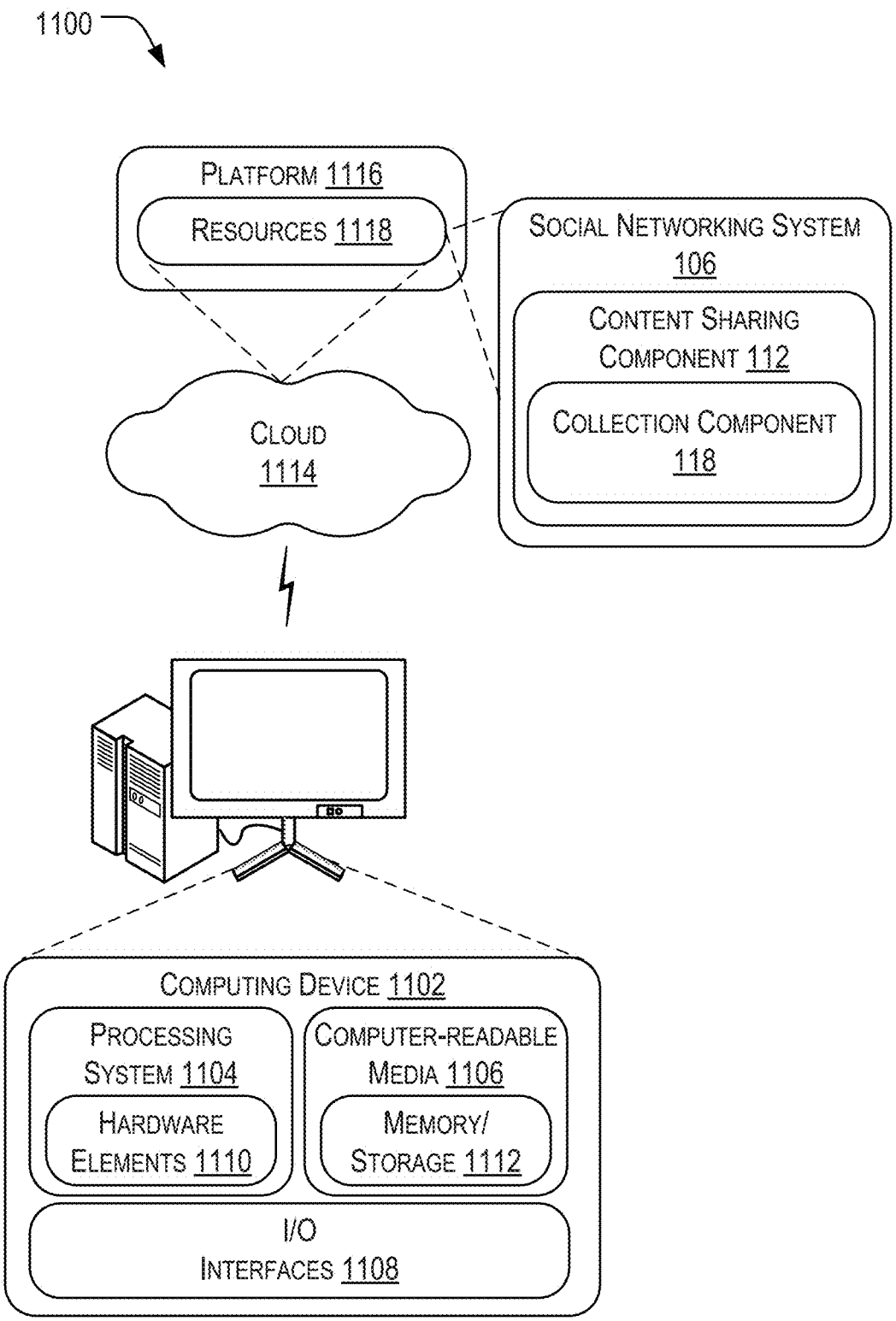
FIG. 11 is an example system and device that is usable to implement the techniques described herein.

FIG. 11 illustrates an example system generally at 1100 that includes an example computing device 1102 that is representative of one or more computing systems and/or devices that may implement the various techniques described herein. This is illustrated through inclusion of the content sharing component 112 and the collection component 118. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "logic," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on and/or transmitted across some form of computer-readable media. The computer-readable media may include a variety of media that may be accessed by the computing device 1102. By way of example, and not limitation, computer-readable media may include "computer-readable storage media" and "computer-readable transmission media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer-readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable transmission media" may refer to a medium that is configured to transmit instructions to the hardware of the computing device 1102, such as via a network. Computer-readable transmission media typically may transmit computer-readable instructions, data structures, program modules, or other data in a modulated data signal, such as carrier waves, data signals, or other transport mechanism. Computer-readable transmission media also include any information delivery media. The term "modulated data signal" means a signal that has one or more of its characteristics set or changed in such a manner as to encode information in the signal. By way of example, and not limitation, computer-readable transmission media include wired media such as a wired network or direct-wired connection, and wireless media such as acoustic, radio frequency (RF), infrared, and other wireless media.

As previously described, hardware elements 1110 and computer-readable media 1106 are representative of modules, programmable device logic and/or device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also be scalable to provide a corresponding level of scale to encountered demand for the resources 1118 that are implemented via the platform 1116. Accordingly, in an interconnected device embodiment, implementation of functionality described herein may be distributed throughout multiple devices of the system 1100. For example, the functionality may be implemented in part on the computing device 1102 as well as via the platform 1116 which may represent a cloud computing environment.

The example systems and methods of the present disclosure overcome various deficiencies of known prior art devices. Other embodiments of the present disclosure will be apparent to those skilled in the art from consideration of the specification and practice of the disclosure contained herein. It is intended that the specification and examples be considered as example only, with a true scope and spirit of the present disclosure being indicated by the following claims.

CONCLUSION

Although the discussion above sets forth example implementations of the described techniques, other architectures may be used to implement the described functionality, and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving, from one or more user accounts associated with a social networking system, multiple content posts to be shared on the social networking system, the multiple content posts being persistent and publicly accessible;
sharing the multiple content posts with a first group of user accounts associated with the social networking system;
receiving, from a first user account of the one or more user accounts, a request to create a collection of one or more content posts of the multiple content posts that were previously shared via the social networking system, wherein at least one content post of the one or more content posts of the collection is received from a second user account of the one or more user accounts that is different from the first user account, and wherein the request comprises a descriptor associated with the collection;
generating the collection of the one or more content posts including the descriptor; and
providing the collection of the one or more content posts and the descriptor to a second group of user accounts associated with the social networking system.

2. The method of claim 1, wherein at least one of the multiple content posts is received from the first user account.

3. The method of claim 1, wherein the descriptor comprises one or more of a title for the collection or a statement describing contents of the collection.

4. The method of claim 1, wherein the descriptor is a first descriptor associated with the collection, the method further comprising receiving a second descriptor associated with one of the one or more content posts included in the collection.

5. The method of claim 4, wherein the second descriptor comprises one or more of a title for the one of the one or more content posts or a statement describing the one of the one or more content posts.

6. The method of claim 1, the method further comprising:
receiving, from the first user account or a third user account of the second group of user accounts, selection of a control to share a link to the collection as an ephemeral content item; and
sharing the link to the collection with the second group of user accounts or a third group of user accounts as part of the ephemeral content item.

7. The method of claim 1, the method further comprising providing a selectable control that, when selected by a user associated with a third user account of the second group of user accounts, causes the third user account to provide feedback on the collection.

8. The method of claim 1, further comprising associating the collection with a location based at least in part on a tagged location of at least one of the one or more content posts included in the collection.

9. The method of claim 1, the method further comprising:
providing a thumbnail associated with the collection on a profile page of the first user account; and
responsive to receiving a selection of the thumbnail from a third user account of the second group of user accounts, providing the collection to be viewed by the third user account.

10. The method of claim 1, further comprising notifying the second user account that the at least one content post is being included in the collection by the first user account.

11. The method of claim 1, further comprising:
receiving, from the second user account, a selection of a control to remove the at least one content post from the collection by the first user account; and
removing, responsive to receiving the selection, the at least one content post from the collection.

12. A system comprising:
one or more processors; and
one or more computer-readable media storing instructions that, when executed by the one or more processors, cause the one or more processors to perform operations comprising:
receiving, from one or more user accounts associated with a social networking system, multiple content posts to be shared on the social networking system, the multiple content posts being persistent and publicly accessible;
sharing the multiple content posts with a first group of user accounts associated with the social networking system;
receiving, from a first user account of the one or more user accounts, a request to create a collection of one or more content posts of the multiple content posts that were previously shared via the social networking system, wherein at least one content post of the one or more content posts of the collection is received from a second user account of the one or more user accounts that is different from the first user account, and wherein the request comprises a descriptor associated with the collection;
generating the collection of the one or more content posts including the descriptor; and
providing the collection of the one or more content posts and the descriptor to a second group of user accounts associated with the social networking system.

13. The system of claim 12, wherein the request to create the collection comprises an indication of a collection type for the collection, the collection type corresponding to at least one of:
- a content post collection type,
- a product post collection type, and
- a place post collection type.

14. The system of claim 13, wherein the indication of the collection type comprises the product post collection type, and the one or more content posts comprise a product post indicating one or more products that are available for purchase via the social networking system.

15. The system of claim 14, wherein the product post comprises one or more characteristics of the one or more products indicated in the product post, the one or more characteristics comprising:
- a product description,
- a price,
- a merchant description associated with a merchant of the one or more products, and
- a link to a website for the merchant.

16. One or more computer-readable media storing instructions that, when executed by one or more processors, cause the one or more processors to perform operations comprising:
- receiving, from one or more user accounts associated with a social networking system, multiple content posts to be shared on the social networking system, the multiple content posts being persistent and publicly accessible;
- sharing the multiple content posts with a first group of user accounts associated with the social networking system;
- receiving, from a first user account of the one or more user accounts, a request to create a collection of one or more content posts of the multiple content posts that were previously shared via the social networking system, wherein at least one content post of the one or more content posts of the collection is received from a second user account of the one or more user accounts that is different from the first user account, and wherein the request comprises a descriptor associated with the collection
- generating the collection of the one or more content posts including the descriptor; and
- providing the collection of the one or more content posts and the descriptor to a second group of user accounts associated with the social networking system.

17. The one or more computer-readable media of claim 16, wherein the request to create the collection comprises an indication of a collection type for the collection, the collection type corresponding to at least one of:
- a content post collection type,
- a product post collection type, and
- a place post collection type.

18. The one or more computer-readable media of claim 17, wherein the indication of the collection type comprises the place post collection type, the operations further comprising:
- receiving a location from the user account to associate with a first item included in the collection;
- determining that a first content post of the one or more content posts was associated with the location when shared on the social networking system;
- including the first content post in the first item in the collection based at least in part on the first content post being associated with the location;
- determining that a second content post of the one or more content posts was associated with a different location than the location when shared on the social networking system; and
- including the second content post in a second item in the collection based at least in part on the second content post being associated with the different location.

19. The one or more computer-readable media of claim 18, the operations further comprising:
- determining that a third content post of the one or more content posts was associated with the location when shared on the social networking system;
- including the third content post in the first item in the collection based at least in part on the first content post being associated with the location;
- receiving, from a third user account of the second group of user accounts, a first user input in a first direction to navigate from viewing the first content post to the second content post in a user interface; and
- receiving, from the third user account, a second user input in a second direction different from the first direction to navigate from viewing the first item to the second item in the user interface.

20. The one or more computer-readable media of claim 16, the operations further comprising:
- receiving, from the second user account, a selection of a control to remove the at least one content post from the collection associated with the first user account; and
- removing, responsive to receiving the selection, the at least one content post from the collection.

* * * * *